Feb. 2, 1926.

P. D. HOLLAND 1,571,411

RESILIENT WHEEL

Filed May 26, 1924

INVENTOR.
Pink D. Holland,
BY
Hardway Cathey
ATTORNEYS.

Patented Feb. 2, 1926.

1,571,411

UNITED STATES PATENT OFFICE.

PINK D. HOLLAND, OF SARATOGA, TEXAS.

RESILIENT WHEEL.

Application filed May 26, 1924. Serial No. 715,935.

*To all whom it may concern:*

Be it known that I, PINK D. HOLLAND, a citizen of the United States, residing at Saratoga, in the county of Hardin and State of Texas, have invented certain new and useful Improvements in a Resilient Wheel, of which the following is a specification.

This invention relates to new and useful improvements in a resilient wheel.

One object of the invention is to provide a wheel of the character described which is resilient so as to be specially adaptable for use on motor vehicles, and which may also be used generally on all kinds of vehicles.

Another object is to produce a wheel having a resilient felloe, or rim, which is not subject to puncture or collapse, and also having resilient spokes which permit the wheel to readily yield when striking objects or moving over rough roads.

A further feature is to provide a wheel having a tread which will grip the road surface and will not readily slip thereon.

A still further feature resides in the combination with a resilient wheel of the character described of a detachable casing adapted to be secured around the tread thereof.

With the above and other objects in view the invention has particular relation to certain novel features of construction, operation and arrangement of parts, an example of which is given in this specification and illustrated in the accompanying drawings, wherein:—

Figure 1:
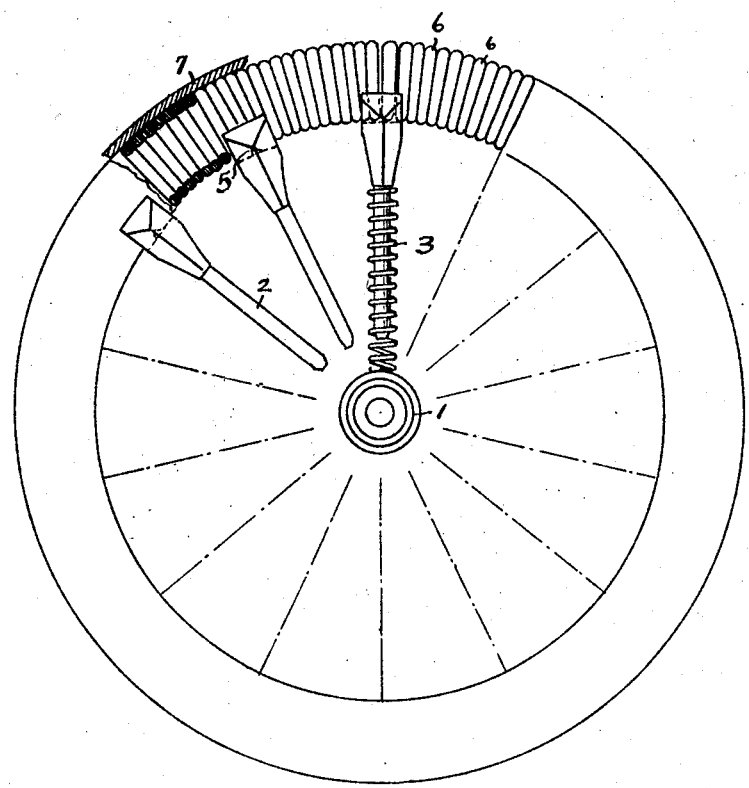
Figure 1 is a side view of the wheel, shown partially in section.
Figure 2:
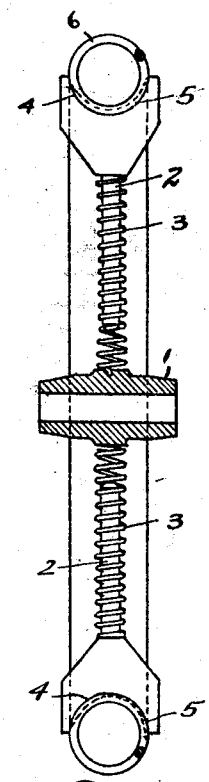
Figure 2 shows a vertical sectional view.
Figure 3:
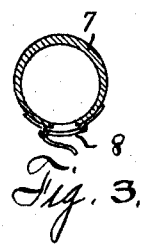
Figure 3 shows a sectional view of the casing employed.

Referring now more particularly to the drawings, the numeral 1 designates the wheel hub and the numeral 2 refers to radiating spokes employed. Surrounding the inner end of each spoke there is a coil spring 3, one end of which is attached to the spoke and the other end of which is secured to the hub. The inner end of each spoke is spaced a sufficient distance from the hub to permit a sufficient amount of radial movement of the spokes. The outer end of each spoke is formed with an arcuate notch 4, which has a spiralled arcuate rib 5 therein.

Seated in the notches of the spokes there is a rim 6 formed of closely spiralled spring wire. The ribs 5 seat between the turns of wire to prevent the rim from creeping on the spokes.

If desired, a casing 7 may be secured around the rim by means of buckles or other securing means 8, and may be readily detached therefrom. This casing is particularly designed to be used on muddy roads to prevent mud from collecting inside of the rim. On dry roads the casing is not necessary but may be used if desired.

What I claim is:—

A resilient wheel including a hub, radiating spokes associated with said hub and whose inner ends are spaced from the hub, coil springs surrounding the inner ends of the spokes, one end of each spring being attached to the respective spoke and the other end of each spring being secured to the hub, the outer end of each spoke being formed with an arcuate notch forming a seat, a spiralled arcuate rib in each seat, a rim formed of spiralled spring wire mounted in the spoke seats, the ribs of said seats fitting between turns of said rim to prevent the rim from creeping on the spokes.

In testimony whereof I have signed my name to this specification.

PINK D. HOLLAND.